(12) United States Patent
Larsen et al.

(10) Patent No.: US 9,371,821 B2
(45) Date of Patent: Jun. 21, 2016

(54) VOLTAGE CONTROL FOR WIND TURBINE GENERATORS

(75) Inventors: Einar Vaughn Larsen, Ballston Lake, NY (US); Sidney Allen Barker, Troutville, VA (US)

(73) Assignee: General Electric Company, Schenectadt, NY (US)

( * ) Notice: Subject to any disclaimer, the term of this patent is extended or adjusted under 35 U.S.C. 154(b) by 498 days.

(21) Appl. No.: 13/600,899

(22) Filed: Aug. 31, 2012

(65) Prior Publication Data

US 2014/0062085 A1 Mar. 6, 2014

(51) Int. Cl.
- *H02P 9/04* (2006.01)
- *F03D 9/00* (2016.01)
- *H02J 3/38* (2006.01)

(52) U.S. Cl.
CPC ............... *F03D 9/005* (2013.01); *H02J 3/386* (2013.01); *Y02E 10/72* (2013.01); *Y02E 10/763* (2013.01)

(58) Field of Classification Search
CPC ...... Y02E 10/723; Y02E 10/72; Y02E 10/763
USPC ......................................................... 700/287
See application file for complete search history.

(56) References Cited

U.S. PATENT DOCUMENTS

| | | | |
|---|---|---|---|
| 4,251,735 A * | 2/1981 | Coleman | 307/46 |
| 4,350,947 A | 9/1982 | Uenosono et al. | |
| 4,400,659 A | 8/1983 | Barron et al. | |
| 4,607,206 A | 8/1986 | Sember et al. | |
| 5,225,712 A | 7/1993 | Erdman | |
| 5,798,633 A * | 8/1998 | Larsen et al. | 323/207 |
| 5,808,499 A | 9/1998 | Behbahani et al. | |
| 5,886,417 A | 3/1999 | Oka et al. | |
| 6,107,784 A | 8/2000 | Nomiya et al. | |
| 6,265,852 B1 | 7/2001 | Kitamura et al. | |
| 6,327,162 B1 | 12/2001 | Larsen et al. | |
| 6,456,056 B1 | 9/2002 | Katoh et al. | |
| 6,479,907 B1 | 11/2002 | Eriksson et al. | |
| 6,512,966 B2 | 1/2003 | Lof et al. | |
| 6,566,764 B2 | 5/2003 | Rebsdorf et al. | |
| 6,590,366 B1 | 7/2003 | Browning et al. | |
| 6,700,356 B1 | 3/2004 | Dorn | |
| 6,762,592 B2 | 7/2004 | Noguchi et al. | |
| 6,815,932 B2 | 11/2004 | Wall | |

(Continued)

FOREIGN PATENT DOCUMENTS

| | | |
|---|---|---|
| DE | 196 20 906 C2 | 1/1998 |
| WO | 03/030329 A1 | 4/2003 |

*Primary Examiner* — Kenneth M Lo
*Assistant Examiner* — Alan Chu
(74) *Attorney, Agent, or Firm* — Dority & Manning, P.A.

(57) ABSTRACT

A voltage control system for a wind turbine generator may include a reactive power regulator configured to control reactive power production by the wind turbine generator by adjusting a voltage setpoint for the generator. The reactive power regulator may have a first time constant and the voltage setpoint may be defined between an upper limit and a lower limit. The system may also include a voltage limit regulator configured to adjust at least one of the upper limit or the lower limit for the voltage setpoint based on a voltage-related parameter. In addition, the system may include a voltage regulator coupled to the reactive power regulator. The voltage regulator may be configured to control real power production by the wind turbine generator based on the voltage setpoint. The voltage regulator may have a second time constant, wherein the first time constant is numerically greater than the second time constant.

12 Claims, 3 Drawing Sheets

(56) References Cited

U.S. PATENT DOCUMENTS

| | | | |
|---|---|---|---|
| 6,856,038 B2 | 2/2005 | Rebsdorf et al. | |
| 6,856,039 B2 | 2/2005 | Mikhail et al. | |
| 6,870,350 B2 | 3/2005 | Garrigan et al. | |
| 6,924,565 B2 | 8/2005 | Wilkins et al. | |
| 7,015,595 B2 | 3/2006 | Feddersen et al. | |
| 7,095,130 B2 | 8/2006 | Ichinose et al. | |
| 7,224,081 B2* | 5/2007 | Larsen | 290/44 |
| 8,049,352 B2* | 11/2011 | Jorgensen et al. | 290/44 |
| 2003/0015876 A1 | 1/2003 | Ichinose et al. | |
| 2003/0151259 A1 | 8/2003 | Feddersen et al. | |
| 2003/0227172 A1 | 12/2003 | Erdman et al. | |
| 2004/0070359 A1 | 4/2004 | Dohnal et al. | |
| 2005/0040655 A1 | 2/2005 | Wilkins et al. | |
| 2005/0042098 A1 | 2/2005 | Wobben | |
| 2005/0200133 A1 | 9/2005 | Wobben | |
| 2006/0028025 A1 | 2/2006 | Kikuchi et al. | |
| 2009/0278351 A1* | 11/2009 | Rivas et al. | 290/44 |
| 2010/0133831 A1* | 6/2010 | Scholte-Wassink | F03D 7/0292 290/44 |
| 2010/0134076 A1* | 6/2010 | Cardinal et al. | 323/207 |
| 2011/0031762 A1* | 2/2011 | Letas | 290/55 |
| 2011/0156389 A1* | 6/2011 | Arlaban Gabeiras et al. | 290/44 |
| 2012/0101640 A1* | 4/2012 | Stapelfeldt | 700/287 |

* cited by examiner

VOLTAGE CONTROL FOR WIND TURBINE GENERATORS

FIELD OF THE INVENTION

The present subject matter relates generally to wind turbine generators and, more particularly, to voltage control systems and techniques for use with wind turbine generators having continuous control of reactive power for at least part of the reactive power compensation function.

BACKGROUND OF THE INVENTION

Wind power generation is typically provided by a wind "farm" having a large number (often 100 or more) of wind turbine generators. Individual wind turbine generators can provide important benefits to power system operation. These benefits are related to mitigation of voltage flicker caused by wind gusts and mitigation of voltage deviations caused by external events.

In a wind farm setting, each wind turbine generator can experience a unique wind force. Therefore, each wind turbine generator can include a local controller to control the response to wind gusts and other external events. Prior art wind farm control has been based on one of two architectures: local control with constant power factor and farm level control in fast voltage control, or local control in constant voltage control with no farm level control.

Both of these prior art control architectures suffer from disadvantages. Local control with constant power factor and farm level control in fast voltage control requires fast communications with aggressive action from the farm level to the local level. If the farm level control is inactive, the local control can aggravate voltage flicker. With constant voltage control on each generator, steady-state operation varies significantly with small deviations in loading on the transmission grid. This causes the wind turbine generators to encounter limits in steady-state operation that prevent a response to disturbances, resulting in a loss of voltage regulation. Because reactive current is higher than necessary during this mode of operation, overall efficiency of the wind turbine generator decreases.

Accordingly, improved voltage control systems and techniques for use with wind turbine generators would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a voltage control system for a wind turbine generator. The system may include a reactive power regulator configured to control reactive power production by the wind turbine generator by adjusting a voltage setpoint for the generator. The reactive power regulator may have a first time constant and the voltage setpoint may be defined between an upper limit and a lower limit. The system may also include a voltage limit regulator configured to adjust at least one of the upper limit or the lower limit for the voltage setpoint based on a voltage-related parameter of the system. In addition, the system may include a voltage regulator coupled to the reactive power regulator. The voltage regulator may be configured to control real power production by the wind turbine generator based on the voltage setpoint. The voltage regulator may have a second time constant, wherein the first time constant is numerically greater than the second time constant.

In another aspect, the present subject matter is directed to a method for controlling a wind turbine generator. The method may generally include receiving a reactive power command, adjusting at least one of an upper limit or a lower limit for a voltage setpoint of the wind turbine generator based on a voltage-related parameter, determining the voltage setpoint based on the reactive power command, determining a reactive current command for the wind turbine generator in response to the voltage setpoint and generating a real and reactive power based on the reactive current command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
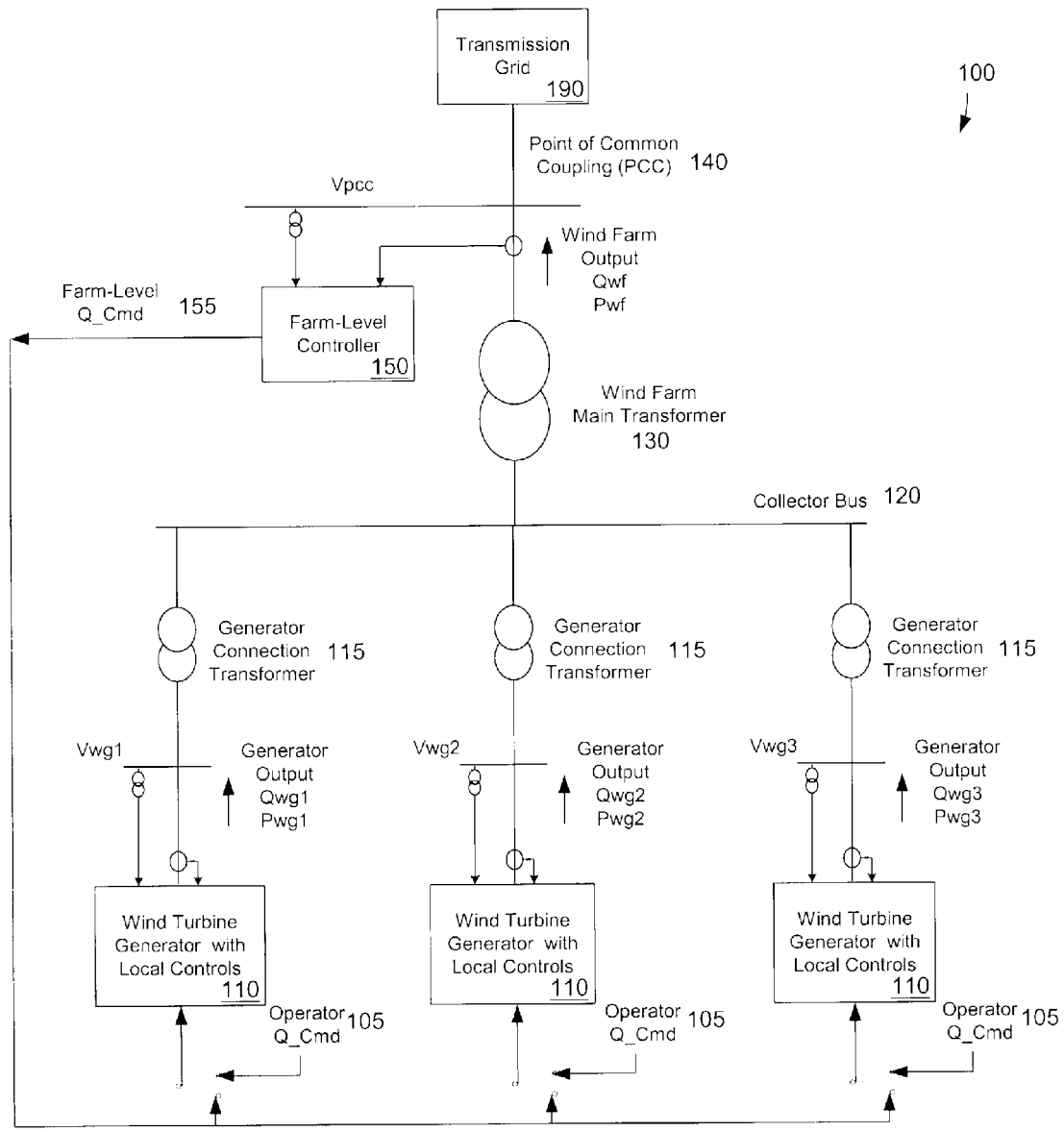
FIG. 1 illustrates a block diagram of a wind farm having multiple wind turbine generators coupled with a transmission grid.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a voltage control system for one or more wind turbine generators including relatively fast regulation of voltage for individual generators with relatively slower overall reactive power regulation at a substation or wind farm level. The relatively slow reactive power regulator may adjust a voltage setpoint of the relatively fast voltage regulator. The fast voltage regulation can be at the generator terminals or at a synthesized remote point (e.g., between the generator terminals and the collector bus). Prior art reactive power controllers are designed with time constants of lower numerical value than those used in voltage regulator design. That is, in the prior art, the reactive power control loop is inside of the voltage control loop, which results in a less stable system than described herein.

It will be apparent to those of ordinary skill in the art that the disclosed control system provides an improved control structure involving both local and farm level control that overcomes the disadvantages of the prior art control architectures described above. Specifically, the disclosed control system eliminates the requirement for fast and aggressive control from the wind farm level, which allows for an improved response in the event that the farm level control is out of service. In addition, the disclosed system provides efficient steady-state operation, while system dynamic response remains well within the limits set.

Moreover, the disclosed system also allows for the upper and/or lower limits of the voltage setpoint generated by the reactive power regulator to be dynamically adjusted in order to account for voltage-related variables within the system. For example, in response to certain overvoltage conditions, such as high grid voltages in combination with electrical phase imbalances and/or high rotor voltages, the upper limit of the voltage setpoint may be lowered or otherwise adjusted to prevent equipment damage due to excessive voltages without the necessity of tripping the system. Thus, by avoiding such preventative tripping actions, the disclosed system may continue to operate despite overvoltage conditions, thereby enhancing the efficiency and overall operation of a wind farm.

Referring to the drawings, FIG. 1 illustrates a block diagram of a wind farm 100 having multiple wind turbine generators 110 coupled with a transmission grid 190. Specifically, as shown, the wind farm 100 includes three wind turbine generators 110. However, it should be appreciated that the wind farm 100 may generally include any number of wind turbine generators 110.

Each wind turbine generator 110 includes a local controller that is responsive to the conditions of the wind turbine generator being controlled. In one embodiment, the controller for each wind turbine generator 110 senses only the terminal voltage and current (via potential and current transformers). The voltage and current sensed are used by the local controller to provide an appropriate response to cause the wind turbine generator 110 to provide the desired reactive power and voltage. A control system diagram corresponding to one embodiment of a wind turbine generator controller is described in greater detail below with respect to FIG. 2.

Referring still to FIG. 1, each wind turbine generator 110 is coupled to a collector bus 120 through generator connection transformers 115 to provide real and reactive power (labeled $P_{wg}$ and $Q_{wg}$, respectively) to the collector bus 120. Generator connection transformers and collector buses are well known in the art and, thus, will not be described in detail herein.

The wind farm 100 provides real and reactive power output (labeled $P_{wf}$ and $Q_{wf}$, respectively) via a wind farm main transformer 130. A farm level controller 150 senses the wind farm output as well as the voltage at a point of common coupling 140 to provide a farm level reactive power command (Farm Level Q Cmd) 155. In one embodiment, the farm level controller 150 provides a single reactive power command to all the wind turbine generators 110 of the wind farm 100. In alternate embodiments, the farm level controller 150 may provide multiple commands for subsets of wind turbine generators 110 of the wind farm 100. The commands to subsets of the wind turbine generators 110 may be based on, for example, additional information related to the operating conditions of one or more of the generators 110.

Figure 2:
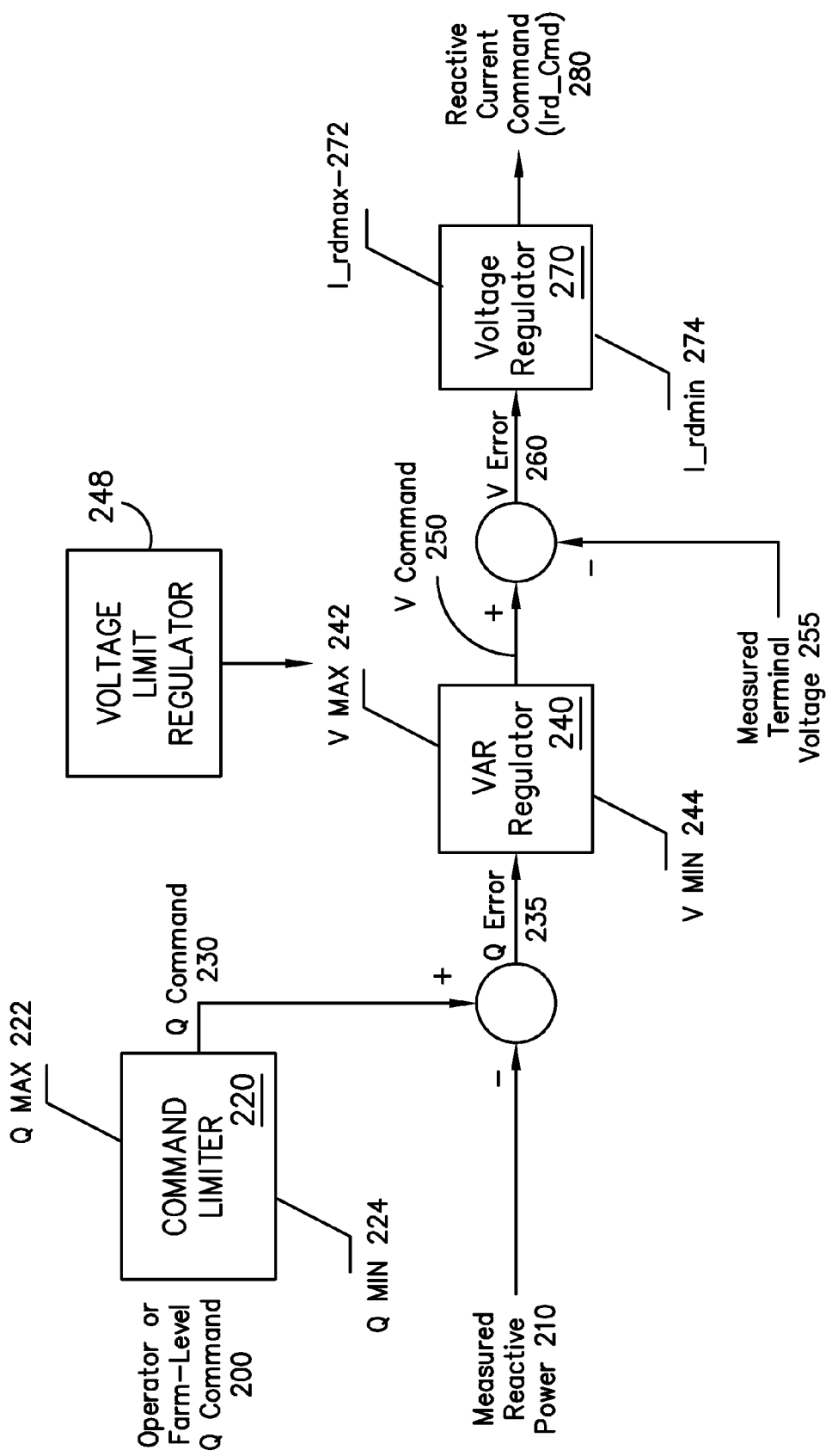
FIG. 2 illustrates a control diagram of one embodiment of a voltage control system configured for use with one or more wind turbine generators.

Referring now to FIG. 2, a control diagram of one embodiment of a wind turbine generator control system is illustrated in accordance with aspects of the present subject matter. In several embodiments, the control system generally includes two loops: a voltage regulator loop and a Q regulator loop. The voltage regulator loop operates relatively fast (e.g., 20 rad/sec) as compared to the Q regulator loop (e.g., greater than 1 second closed loop time constant). As will be described below, the Q regulator may be utilized to adjust the voltage setpoint of the voltage regulator.

Conceptually, the control system of FIG. 2 provides for wind turbine generator terminal voltage control by regulating the voltage according to a reference set by a higher-than-generator-level (e.g., substation or wind farm) controller. Reactive power is regulated over a longer term (e.g., several seconds) while wind turbine generator terminal voltage is regulated over a shorter term (e.g., less than several seconds) to mitigate the effects of fast grid transients.

An operator or farm level Q command 200 is a signal that indicates desired reactive power at the generator terminals. In farm level operation, the wind turbine generator Q command 200 is set equal to the output of the farm level control (line 155 in FIG. 1). In local control, the operator command is set manually, either at the wind generator location or at a remote location. The operator or farm level Q command 200 can be generated or transmitted by, for example, a computer system used to control the wind turbine generator. The operator or farm level Q command 200 can also come from a utility grid operator or substation.

In one embodiment, the operator or farm level Q command 200 is transmitted to a command limiter 220, which operates to maintain reactive power commands within a predetermined range. As shown in FIG. 2, Qmax 222 and Qmin 224 may generally indicate the upper and lower bounds on the reactive power command range.

The specific values used for $Q_{max}$ and $Q_{min}$ may be based on, for example, generator reactive capabilities. In one embodiment the value for $Q_{max}$ is 800 kVAR and the value for $Q_{min}$ is −1200 kVAR for a 1.5 MW wind turbine generator. However, it should be readily appreciated that the specific values for $Q_{max}$ and $Q_{min}$ may generally depend upon the capability of the specific generators being used.

As shown in FIG. 2, the signal output by the command limiter 220 is a Q command 230, which is a command indicating the target reactive power to be produced. The Q command 230 is in the range between $Q_{min}$ 224 and $Q_{max}$ 222. Additionally, as shown in FIG. 2, the Q command 230 may be compared to a signal indicating measured reactive power 210. The resulting error signal, Q error 235, indicates the difference between the measured reactive power and the commanded reactive power.

The Q error 235 is an input signal to a reactive power regulator 240 (hereinafter referred to as the VAR regulator 240), which generates a voltage setpoint 250 (hereinafter referred to as the V command 250) that indicates to a wind turbine generator 110 the reactive power to be provided by the generator. In one embodiment, the VAR regulator 240 is a proportional integral (PI) controller that has a closed-loop time constant in the range of 1 to 10 seconds (e.g., 3 seconds, 5 seconds, 5.5 seconds). Other types of controllers may be also be used, for example, proportional derivative (PD) controllers, proportional integral derivative (PID) controllers, state space controllers, etc. Additionally, other time constants can be used for the VAR regulator 240 provided that the time constant for the VAR regulator 240 is numerically greater than the time constant for a voltage regulator 270 (described below).

In several embodiments, the V command 250 may be limited to a predetermined range between $V_{max}$ 242 and $V_{min}$ 244. For example, in one embodiment, $V_{max}$ 242 and $V_{min}$ 244 may be defined in terms of a percentage of the rated generator output, such as by defining $V_{max}$ 242 as 105% of the rated generator voltage while defining $V_{min}$ 244 can be 95% of the rated generator voltage. However, it should be appreciated that alternate upper and lower limits may also be used.

In addition to defining a predetermined range or as an alternative thereto, the values for Vmax 242 and/or Vmin 244 may be set and/or dynamically adjusted based on the operating parameters of one or more of the wind turbine generators 110 and/or based on any other operating parameters of the entire system. For example, as shown in FIG. 2, in several embodiments, the control system may include a voltage limit regulator 248 configured to set/adjust the value of Vmax 242 based on one or more voltage-related parameters of the wind farm 100. Specifically, in one embodiment, the voltage limit regulator 248 may be configured to set/adjust the value of Vmax 242 based on the maximum, instantaneous individual phase voltage at any point within the system. In another embodiment, the voltage limit regulator 248 may be configured to set/adjust the value of Vmax 242 based on any other suitable voltage-related parameter, such as the maximum, instantaneous rotor voltage of one or more of the generators 110 of the wind farm 100.

It should be appreciated that, by using the voltage limit regulator 248 as described above, other voltage-based power system values may be maintained within equipment capabilities, thereby allowing the system to operate without requiring the performance of certain preventative actions. For example, overvoltage tripping actions are often performed when certain voltage-related conditions are present in combination with specific grid conditions, such as when there is high grid voltage simultaneous with a voltage imbalance across the three phases or when there is high grid voltage simultaneous with high generator speed and power output (which can lead to high rotor voltage in some types of generators, such as dual-fed generators). However, by setting or otherwise adjusting the value for $V_{max}$ 242 based on one or more relevant voltage-related parameters of the system, the wind turbine generator(s) 110 of the wind farm 100 may continue to operate at reduced reactive capacities without the need to trip the entire system. As such, the overall efficiency and operation of the wind farm 100 may be improved.

It should also be appreciated that, in addition to setting/adjusting the value for $V_{max}$ 242 or as an alternative thereto, the voltage limit regulator 248 may also be configured to set or dynamically adjust the value for $V_{min}$ 244 based on one or more voltage-related parameters of the system.

Referring still to FIG. 2, the V command 250 derived from the VAR regulator 240 is compared to a signal indicating a measured terminal voltage 255 for the generator. The difference between the V command 250 and the measured terminal voltage 255 is a voltage error signal 260. The voltage error signal 260 is then input into a voltage regulator 270 of the disclosed system.

The voltage regulator 270 generates a reactive current command 280, which is used to control generator reactive current and, thus, generator reactive power ($Q_{wg}$ in FIG. 1). In one embodiment, the voltage regulator 270 is a PI controller that has a closed-loop time constant of approximately 50 milliseconds. Other types of controllers can also be used, for example, PD controllers, PID controllers, etc. In addition, other time constants may also be used (e.g., 1 second, 20 milliseconds, 75 milliseconds, 45 milliseconds) for the voltage regulator 270 provided that the time constant for the regulator 270 is less than the time constant for the VAR regulator 240.

In general, there are two components of a reactive current command: the real power component denoted as Irq_Cmd and the reactive power component denoted as Ird_Cmd. The reactive current command 280 (generated as described above with respect to FIG. 2) is the reactive component or Ird_Cmd command. The real component or Irq_Cmd can be generated in any manner known in the art. Reactive current command 280 is limited to $I_{rdmax}$ 272 and $I_{rdmin}$ 274. The values for $I_{rdmax}$ 272 and $I_{rdmin}$ 274 can be based on generator current ratings.

Figure 3:
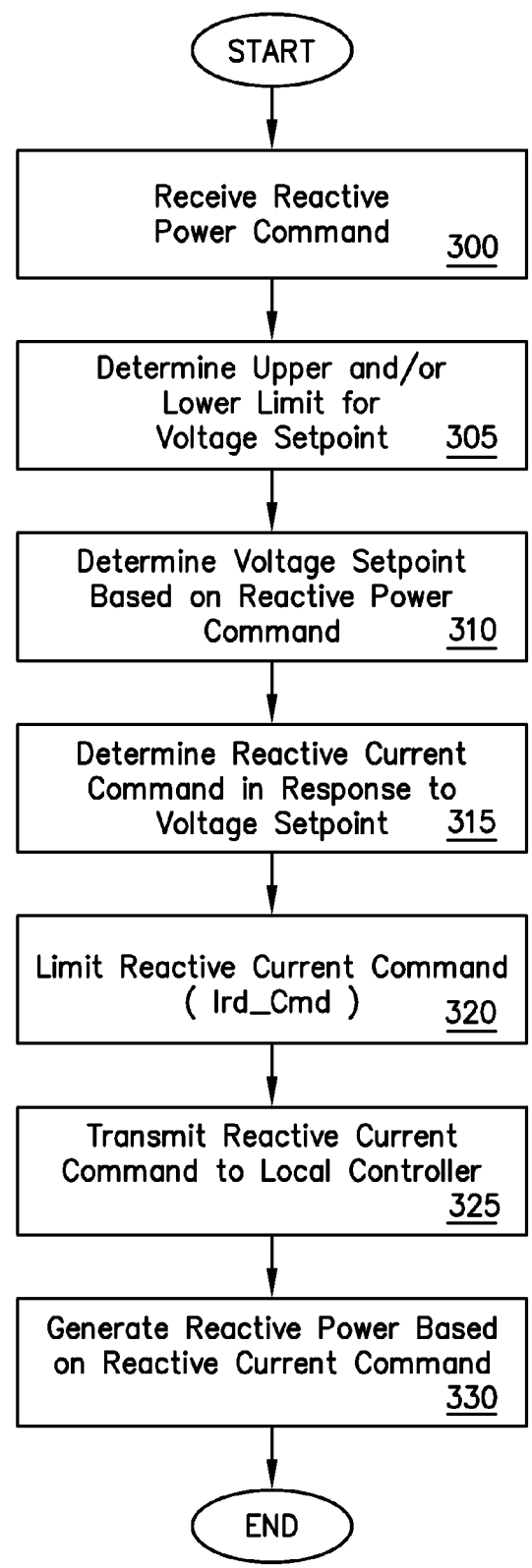
FIG. 3 illustrates a flow diagram of one embodiment of the operation of a wind turbine control system.

In one embodiment, all of the limits discussed above with respect to FIG. 2 are non-windup limits; however, in alternate embodiments, a subset of the limits can be non-windup limits. Additionally, most of the limits have been discussed in terms of fixed parameters. However, similar to the value for $V_{max}$ 242 described above, dynamically variable parameters provided by, for example, a lookup table or a processor or state machine executing a control algorithm can also provide the limits. Such dynamically variable limits may be based upon any suitable parameters, such as the current rating of the generator and/or the contemporaneous real power output Referring now to FIG. 3, a flow diagram of one embodiment of the operation of a generator control system is illustrated in accordance with aspects of the present subject matter. As shown, at 300, a reactive power command is received. As mentioned above, the reactive power command can be an operator command, farm level command, or a local command.

At 305, the upper and/or lower limits for the voltage setpoint (i.e., V Command 250 shown in FIG. 2) may be determined. As indicated above, the voltage setpoint may be limited to a predetermined range defined by upper and lower limits that are based on the generator terminal voltage. For example, in one embodiment, the limits may be defined in terms of percentage of rated generator output, such as by defining the upper limit as 105%, 110%, 102%, 115% of the rated generator voltage and the lower limit as 95%, 98%, 92%, 90%, 97% of the rated generator voltage. However, in other embodiments, the upper and/or lower limits of the voltage setpoint may be set and/or dynamically adjusted according to measured or predicted operating parameters of the system. For instance, as described above, the upper limit (or $V_{max}$ 242) may be set and/or adjusted by the voltage limit regulator 248 based on one or more voltage-related parameters of the system.

Additionally, it should be appreciated that, in several embodiments, the upper and/or lower limits of the voltage setpoint may be initially set as a function of a predetermined range (e.g., based on generator terminal voltage) and subsequently adjusted using the voltage limit regulator 248 to account for varying grid and/or system operating conditions.

At 310, the voltage setpoint is determined based on the reactive power command, with the voltage setpoint being limited to a value defined between the upper and lower limits. Additionally, at 315, a reactive current command for the generator is determined based on the voltage setpoint. The reactive current command may be limited, at 320, to a range based on, for example, the current rating of the generator. For example, crest current ratings can be used for the limits, or percentages of crest current ratings can be used for the limits. Moreover, at 325, the reactive current command is transmitted to the local controller for the wind turbine generator 110, which causes the commanded current to be provided to the generator. Thereafter, at 330, the generator may provide a reactive power output ($Q_{wg}$ in FIG. 1) based on the reactive current command.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A voltage control system for a wind turbine generator, the system comprising:
   a reactive power regulator configured to control reactive power production by adjusting a voltage setpoint for the wind turbine generator, the reactive power regulator having a first time constant, the voltage setpoint being defined between an upper limit and a lower limit, initial values for the upper and lower limits being set as a function of a terminal voltage for the wind turbine generator;
   a voltage limit regulator configured to dynamically adjust the initial value for the upper limit of the voltage setpoint to an adjusted value based on a maximum instantaneous rotor voltage for the wind turbine generator such that he upper limit of the voltage setpoint is reduced below the initial value set based on the terminal voltage in response to an overvoltage condition for the wind turbine generator; and
   a voltage regulator coupled to the reactive power regulator, the voltage regulator configured to control real power production by the wind turbine generator based on a voltage error signal corresponding to a difference between the voltage setpoint generated by the reactive power regulator and a measured voltage, the voltage regulator having a second time constant, wherein the first time constant is numerically greater than the second time constant.

2. The system of claim 1, wherein the first time constant is greater than one second.

3. The system of claim 1 wherein an input signal to the reactive power regulator comprises an error signal indicating a difference between a command limited to a predetermined range and a signal indicating measured reactive power.

4. The system of claim 3, wherein the predetermined range is defined by upper and lower limits based on generator reactive power capacity.

5. The system of claim 1 wherein the measured voltage corresponds to a measured terminal voltage.

6. A method for controlling a wind turbine generator, the method comprising:
   receiving a reactive power command;
   setting initial values for upper and lower limits of a voltage setpoint for the wind turbine generator as a function of a terminal voltage for the wind turbine generator;
   dynamically adjusting the initial value for the upper limit of the voltage setpoint to an adjusted value based on a maxmimum instanteous rotor voltage for the wind turbine generator such that the upper limit is reduced below the initial value set based on the terminal voltage in response to an overvoltage condition for the wind turbine generator;
   determining the voltage setpoint based on the reactive power command such that the voltage setpoint falls within the upper and lower limits;
   generating a voltage error signal based on a difference between the voltage setpoint and a measured voltage;
   determining a reactive current command for the wind turbine generator based on the voltage error signal; and
   generating a real and reactive power based on the reactive current command.

7. The method of claim 6, wherein adjusting the initial value for the upper limit of the voltage setpoint based on a maximum instantaneous rotor voltage for the wind turbine generator comprises lowering the upper limit of the voltage setpoint to prevent the occurrence of an overvoltage tripping action based on the maximum instantaneous rotor voltage for the wind turbine generator.

8. The method of claim 6, wherein determining the voltage setpoint based on the reactive power command comprises determining the voltage setpoint with a reactive power regulator, the voltage setpoint being transmitted to a voltage regulator.

9. The method of claim 8, wherein a time constant of the voltage regulator is numerically less than a time constant of the reactive power regulator.

10. The method of claim 6, wherein receiving a reactive power command comprises receiving a farm level reactive power command from a farm level controller that transmits reactive power commands to multiple wind turbine generators.

11. The method of claim 6, wherein receiving a reactive power command comprises receiving a reactive power command locally from a source providing a reactive power command for a single wind turbine generator.

12. The method of claim 6, further comprising transmitting the reactive current command to a controller of the wind turbine generator.

* * * * *